United States Patent [19]
Ma

[11] Patent Number: 6,078,407
[45] Date of Patent: Jun. 20, 2000

[54] PORTABLE COMPUTER AND SCANNER ARRANGEMENT

[76] Inventor: His Kuaeg Ma, 4F, No.48, Sec.2, Chung Cherng Rd, Taipei, Taiwan

[21] Appl. No.: 08/986,780

[22] Filed: Dec. 8, 1997

[51] Int. Cl.[7] .............................. H04N 1/04; H05K 5/00
[52] U.S. Cl. .......................... 358/474; 358/497; 361/686; 361/683; 361/680; 361/681
[58] Field of Search .................................... 358/497, 403, 358/494, 400, 474, 471, 505, 506, 487, 498, 496; 382/312, 313; 395/105; 361/686, 680, 683, 681; 108/43; 364/708.1; 345/901, 156; H04N 1/64; H05K 5/00

[56] References Cited

U.S. PATENT DOCUMENTS

| | | | |
|---|---|---|---|
| 4,831,457 | 5/1989 | Watanabe et al. | 358/497 |
| 5,263,423 | 11/1993 | Anderson | 108/43 |
| 5,355,357 | 10/1994 | Yamamori et al. | 361/680 |
| 5,386,298 | 1/1995 | Bronnenberg et al. | 358/403 |
| 5,443,320 | 8/1995 | Agata et al. | 361/680 |
| 5,479,269 | 12/1995 | Bronnenberg et al. | 358/403 |
| 5,845,144 | 12/1998 | Tateyama et al. | 361/683 |
| 5,907,413 | 5/1999 | Han | 358/497 |

*Primary Examiner*—Cheukfan Lee
*Attorney, Agent, or Firm*—Dougherty & Troxell

[57] ABSTRACT

A portable computer and scanner arrangement which includes a scanner having a substantially rectangular scanner frame, a transparent glass plate mounted within the scanner frame for carrying document to be scanned, two parallel rails mounted within the scanner frame below the transparent glass, a scanning mechanism moved along the parallel rails to pick up image from document carried on the transparent glass, and two foot plates bilaterally hinged to its bottom side and turned between a horizontal position and a vertical position, a keyboard plate hinged to the scanner frame and adapted to hold down document on the transparent glass, the keyboard plate having a set of key switches for data input, a planar display hinged to the scanner frame and adapted to cover the keyboard plate, and a portable computer mainframe mounted within the scanner frame at a bottom side and retained thereto by the foot plates when the foot plates are turned to the horizontal position, the portable computer mainframe having ribbon cables respectively connected to the scanner, the planar display and the keyboard plate for signal transmission.

8 Claims, 3 Drawing Sheets

PORTABLE COMPUTER AND SCANNER ARRANGEMENT

BACKGROUND OF THE INVENTION

The present invention relates to a portable computer and scanner arrangement which arranges a portable computer and a scanner into a compact unit.

A variety of data input devices including keyboard, mouse, scanner, etc., may be used with a computer system for data input. For graphic data input, a scanner is an important tool. When document is scanned by a scanner, picked up data must be sent from the scanner to a computer for storage, i.e., a scanner must be used with a computer. Because a scanner is an independent apparatus, it is inconvenient to carry a portable computer and a scanner outdoors.

SUMMARY OF THE INVENTION

The present invention combines a portable computer and a scanner into a compact unit convenient for carrying by hand. According to the preferred embodiment of the present invention, the arrangement comprises a scanner having a substantially rectangular scanner frame, a transparent glass plate mounted within the scanner frame for carrying document to be scanned, two parallel rails mounted within the scanner frame below the transparent glass, a scanning mechanism moved along the parallel rails to pick up image from document carried on the transparent glass, and two foot plates bilaterally hinged to its bottom side and turned between a horizontal position and a vertical position, a keyboard plate hinged to the scanner frame and adapted to hold down document on the transparent glass, the keyboard plate having a set of key switches for data input, a planar display hinged to the scanner frame and adapted to cover the keyboard plate, and a portable computer mainframe mounted within the scanner frame at a bottom side and retained thereto by the foot plates when the foot plates are turned to the horizontal position, the portable computer mainframe having ribbon cables respectively connected to the scanner, the planar display and the keyboard plate for signal transmission.

BRIEF DESCRIPTION OF THE DRAWINGS

In order that the present invention may more readily be understood the following description is given, merely by way of example with reference to the accompanying drawings, in which.

DETAILED DESCRIPTION OF THE PREFERRED EMBODIMENT

Figure 1:
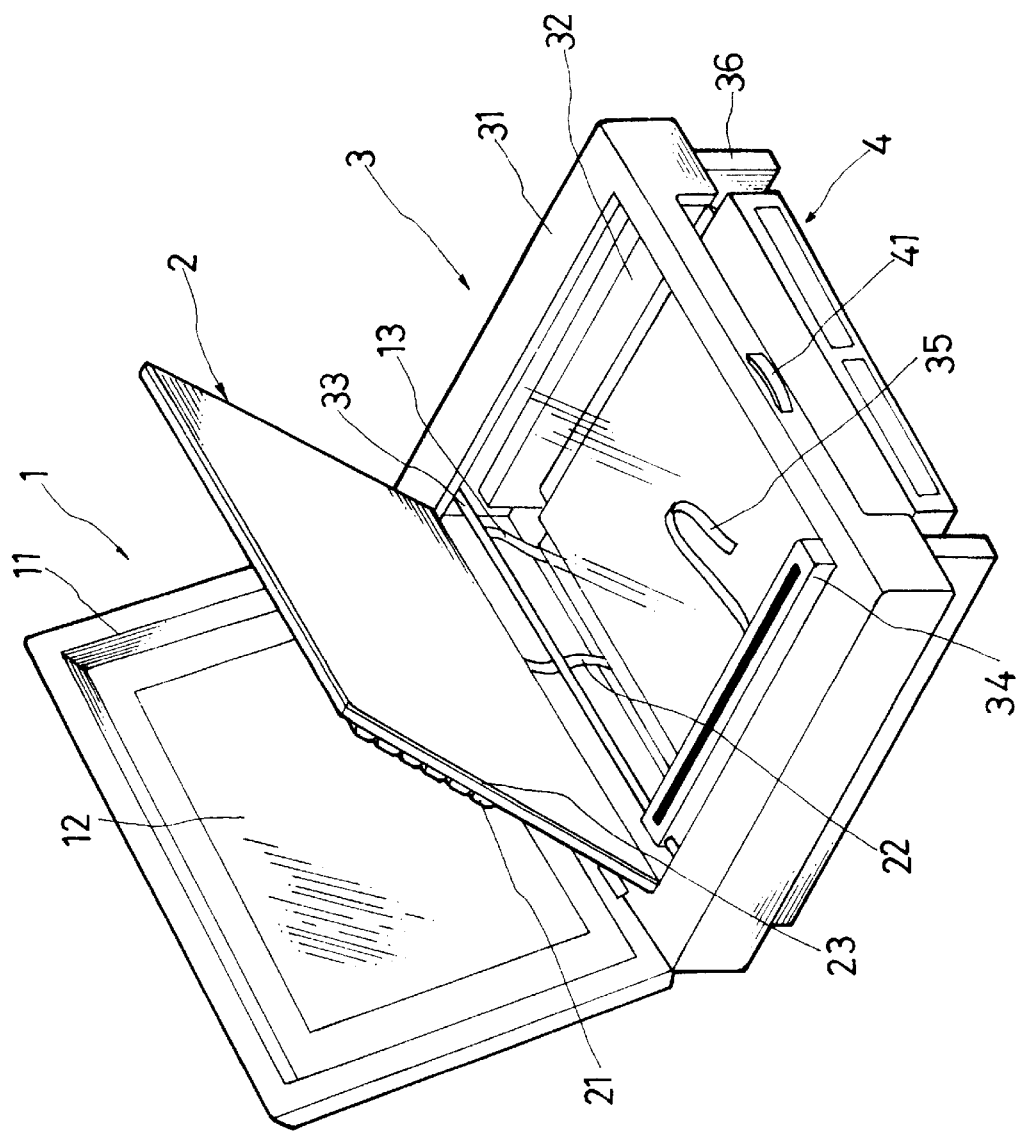
FIG. 1 is a perspective view of a portable computer and scanner arrangement when set for scanning.
Figure 2:
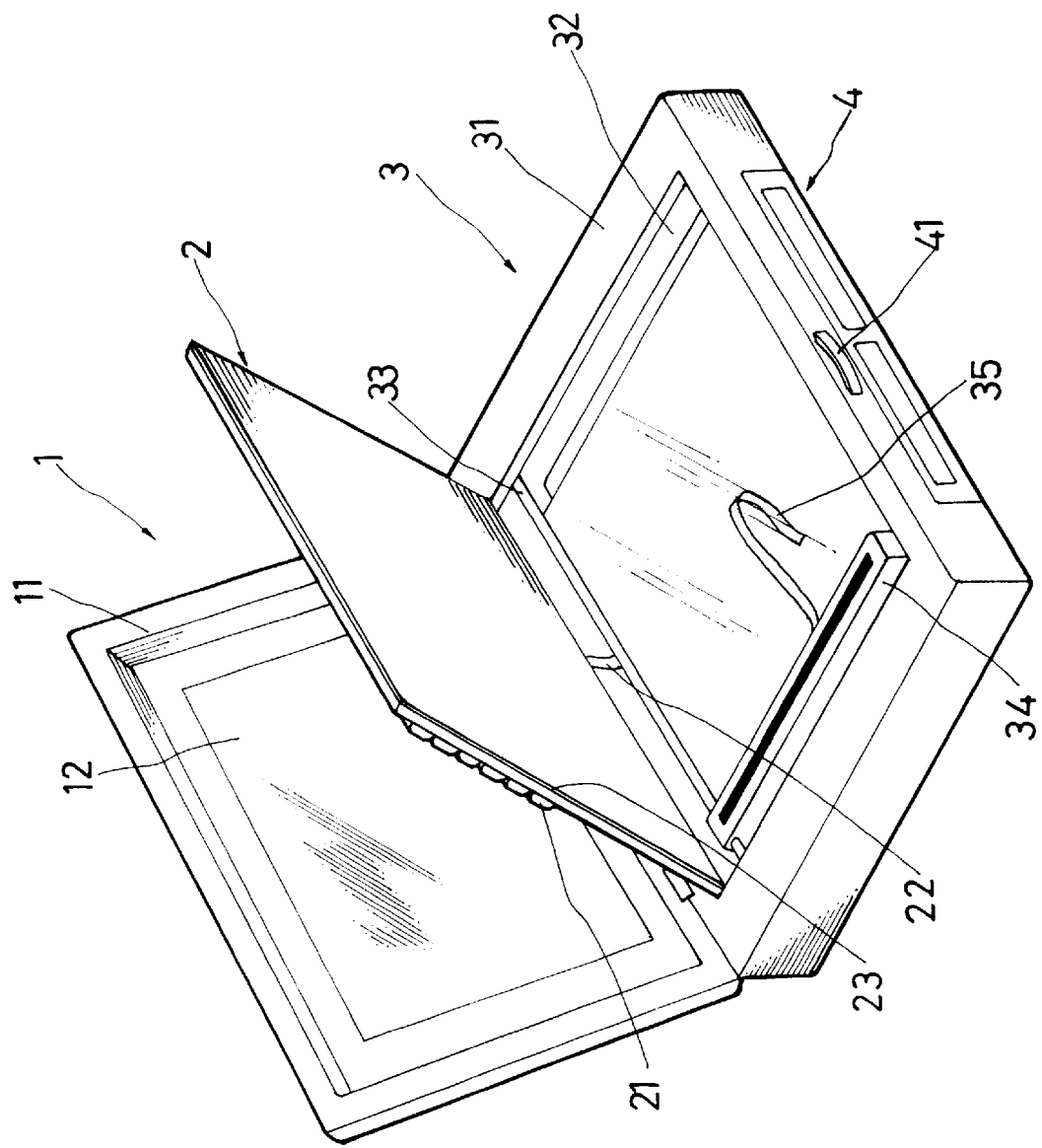
FIG. 2 is similar to FIG. 1 but showing the foot plates turned to the horizontal position, the computer mainframe secured to the scanner frame of the scanner.
Figure 3:
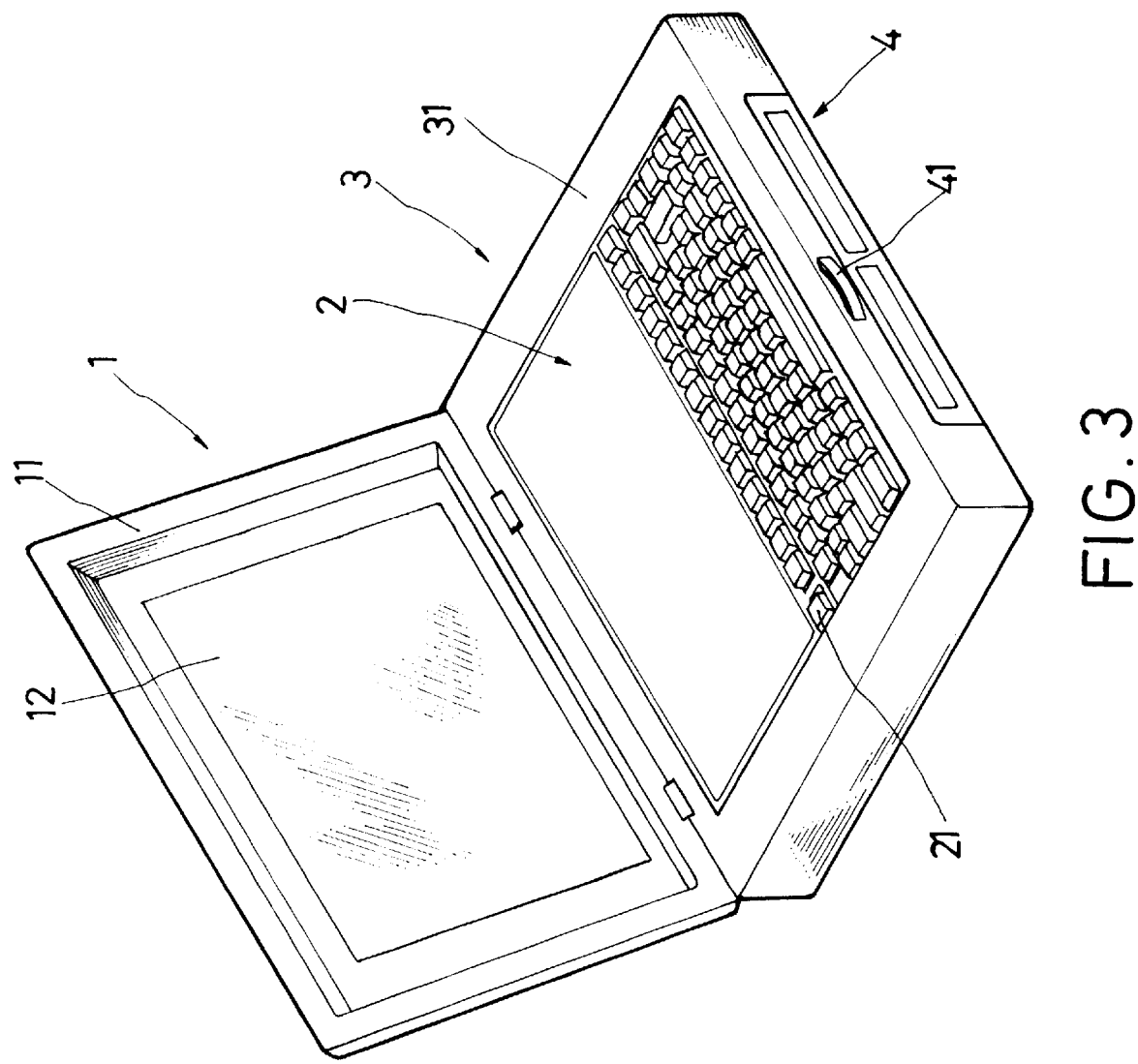
FIG. 3 is similar to FIG. 2 but showing the keyboard plate closed on the scanner for operation.

Referring to FIGS. 1, 2 and 3, the present invention comprises a planar display 1, a keyboard plate 2, a scanner 3, and a computer mainframe 4.

The planar display 1 is comprised of a display frame 1, and a display module 12 mounted within the display frame 1. The display frame 1 and the display module 12 define a receiving space adapted to receive the keyboard plate 2. The planer display 1 is hinged to one side, namely, the back side of the scanner 3, and connected to the computer mainframe 4 by a ribbon cable 13 to receive display data from it.

The keyboard plate 2 is hinged to the scanner 3 adjacent to the planar display 1, comprising a set of key switches 21 and/or other input devices such as trackball and the like for data input, a ribbon cable 22 connected to the computer mainframe 4, and a soft backing 23 adapted to hold down document to be scanned.

The scanner 3 comprises a substantially rectangular scanner frame 31, a transparent glass plate 32 mounted within the scanner frame 31 for carrying document to be scanned, two parallel rails 33 mounted within the scanner frame 31 below the transparent plate 32, a scanning mechanism 34 moved along the parallel rails 33 to pick up image from document carried on the transparent glass plate 32, and a ribbon cable 35 adapted to connect the scanning mechanism 34 to the computer mainframe 4. The scanning mechanism 34 uses a CCD (charge coupled device) or CIS (contact image sensor) to pick up image from document.

The scanner 3 further comprises two foot plates 36 hinged respectively hinged its bottom side. The foot plates 36 can be turned between a horizontal position where the foot plates 36 are closely attached to the bottom side of the scanner 3 to hold the computer mainframe 4 in place, and a vertical position where the scanner 3 is supported on the foot plates 36 and spaced above the computer mainframe 4.

The computer mainframe 4 achieves the functions of for example a regular notebook computer, and is mounted within the scanner frame 31 at the bottom for communication with the planer display 1, the keyboard plate 2 and the scanner 3 by the respective ribbon cables 13; 22; 35. Further, a carrying handle 41 is provided at the front side of the computer mainframe 4 through which the whole assembly can be conveniently carried with the hand.

When the planar display 1 is opened from the scanner 3, as shown in FIG. 3, the planer display 1, the keyboard plate 2 and the computer mainframe 4 work as a regular computer. When to scan document, the keyboard plate 2 is lifted (see FIG. 2), and then the foot plates 36 are turned to the vertical position to lift the scanner frame 31 from the computer mainframe 4 (see FIG. 1). When document is put on the transparent glass plate 32, the keyboard plate 2 is closed, and then the scanning mechanism 34 is controlled to scan document by a software program, permitting picked up signal to be transmitted to the computer mainframe 4 through the ribbon cable 35.

While only one embodiment of the present invention has been shown and described, it will be understood that various modifications and changes could be made thereunto without departing from the spirit and scope of the invention disclosed.

What is claimed is:

1. A portable computer and scanner arrangement comprising:

a scanner comprising a substantially rectangular scanner frame, a glass plate mounted within said scanner frame for supporting a document to be scanned, two parallel rails mounted within said scanner frame below said glass plate, a scanning mechanism adapted to move along said parallel rails to pick up image from the document carried on said transparent glass, and two foot plates bilaterally hinged to a bottom side of said scanner, said foot plates adapted to rotate between a horizontal position and a vertical position;

a keyboard plate hinged to said scanner frame and adapted to hold down document on said transparent glass plate of said scanner, said keyboard plate having a set of key switches for data input;

a planar display hinged to said scanner frame and adapted to cover said keyboard plate, said planer display comprising a display frame and a display module mounted within said display frame; and a portable computer mainframe mounted within said scanner frame at the bottom side of said scanner frame and retained thereto by said foot plates when said foot plates are turned to the horizontal position, said portable computer mainframe having cables connected to said scanner, said planar display and said keyboard plate for signal transmission.

2. The portable computer and scanner arrangement of claim 1, wherein said keyboard plate has a soft backing to hold down the document on said glass plate.

3. The portable computer and scanner arrangement of claim 1, wherein said scanning mechanism comprises a charge coupled device.

4. The portable computer and scanner arrangement of claim 1, wherein said scanning mechanism comprises a contact image sensor.

5. The portable computer and scanner arrangement of claim 1, wherein said cables are ribbon cables.

6. The portable computer and scanner arrangement of claim 1, wherein said computer mainframe has a front side equipped with a carrying handle.

7. The portable computer and scanner arrangement of claim 1, wherein said keyboard plate is equipped with a data input device.

8. The portable computer and scanner arrangement of claim 1, wherein said display frame and said display module define a space for receiving said keyboard plate.

* * * * *